Figure 1:
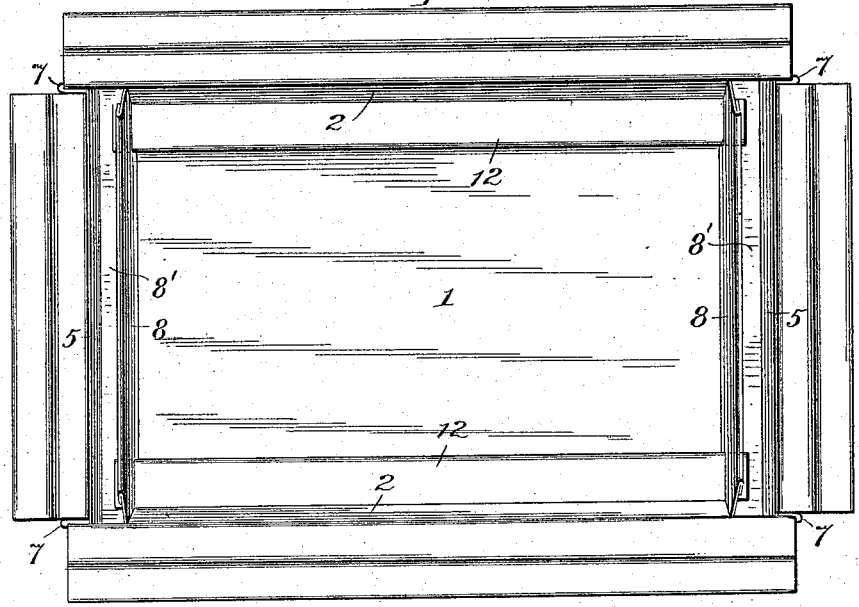

S. T. WHITE.
METAL FLOWER BOX.
APPLICATION FILED JUNE 15, 1915.

1,175,102.

Patented Mar. 14, 1916.
2 SHEETS—SHEET 1.

Witness
Jas. E. Hutchinson

Inventor:
Samuel T. White
By Bollinger & Block Attorneys

S. T. WHITE.
METAL FLOWER BOX.
APPLICATION FILED JUNE 15, 1915.

1,175,102.

Patented Mar. 14, 1916.
2 SHEETS—SHEET 2.

Witness
Jas. E. Hutchinson

Inventor:
Samuel T. White,
By Bollinger & Block Attorneys

UNITED STATES PATENT OFFICE.

SAMUEL T. WHITE, OF DAVENPORT, IOWA.

METAL FLOWER-BOX.

1,175,102.

Specification of Letters Patent.

Patented Mar. 14, 1916.

Application filed June 15, 1915. Serial No. 34,204.

*To all whom it may concern:*

Be it known that I, SAMUEL T. WHITE, a citizen of the United States, residing at Davenport, in the county of Scott and State of Iowa, have invented certain new and useful Improvements in Metal Flower-Boxes, of which the following is a specification.

The invention relates to improvements in a window box for flowers, plants or the like, which is so constructed as to promote in a simple way the growth of the plant without in any way altering the appearance of the box. Heretofore, in the construction of window boxes of this character in order to provide an efficient water feed for the flowers or plants contained therein, it has been customary to have the bottom of the box extended beyond one of the walls thereof, and have the said bottom provided with an upturned flange at its outer end producing a water chamber or receptacle having communication with the interior of the box. The water feed for the box has also been constructed by stamping in or bending a portion of one of the walls thereof to provide an opening through which water may be introduced to the plants within the box. These various constructions have been found to contain many disadvantages, by failing to provide a chamber of sufficient capacity to hold and supply the required amount of water to the plants, as well as giving the box a very unsightly appearance.

The primary object of the present invention is to provide an inexpensive box for the purposes described, composed of a minimum number of parts and embodying novel features of construction which overcome the difficulties heretofore encountered.

The invention comprehends the use of a water chamber or reservoir for the reception of the water to insure the growth of the flowers or plants within the box, and the arranging of the water chambers, together with water conducting tubes communicating with the said chambers and extending substantially throughout the length of the box, and having the chamber and conducting members inclosed within the confines of the box or receptacle, thus producing a box that is very efficient so far as the watering of the plants is concerned, and in no way marring the ornamental appearance of the walls of the same.

Another object of my invention is to construct a flower box with open ended double side and end walls, spaced from each other to provide an air space therebetween, permitting the free circulation of air between the folds, and entirely eliminating any danger of baking the roots of the plants within the box when the box is exposed to sunlight. This baking or burning of the plants very often occurring when a single metal wall is used in view of the fact that the metal has a tendency to store up and radiate the heat collected from the sun-light.

With these and other objects in view, the invention consists in certain novel combinations and relations of parts as will more fully appear as the description proceeds, the novel features thereof being pointed out in the claims.

For a complete understanding of the invention reference is to be had to the following description and accompanying drawings, in which—

Figure 2:
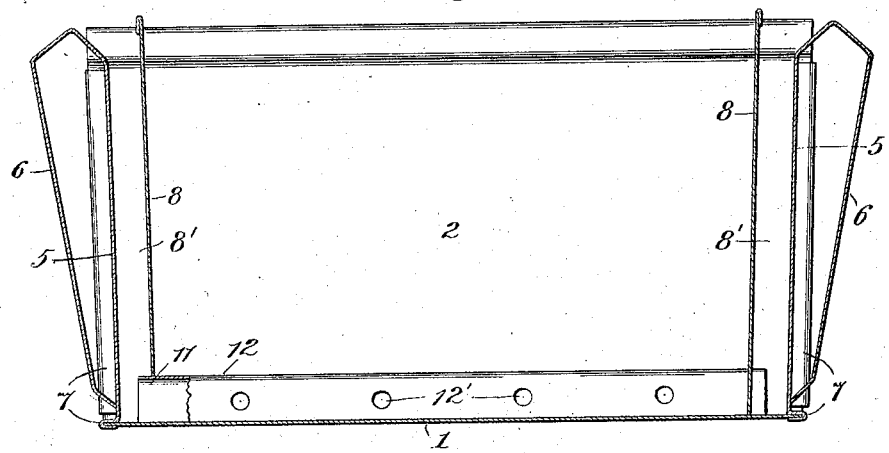
Figure 3:
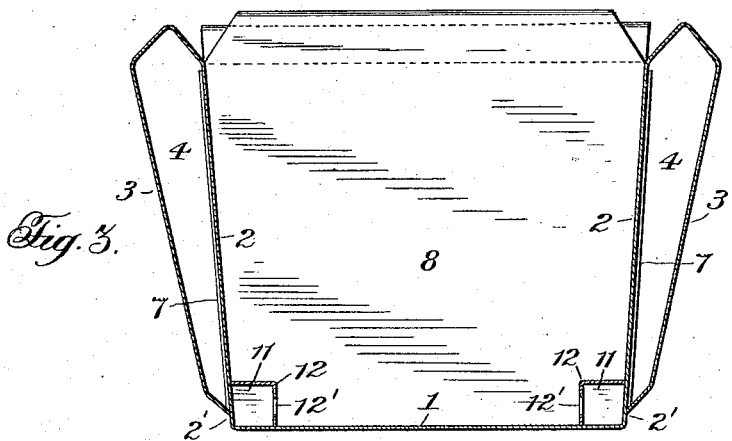
Figure 4:
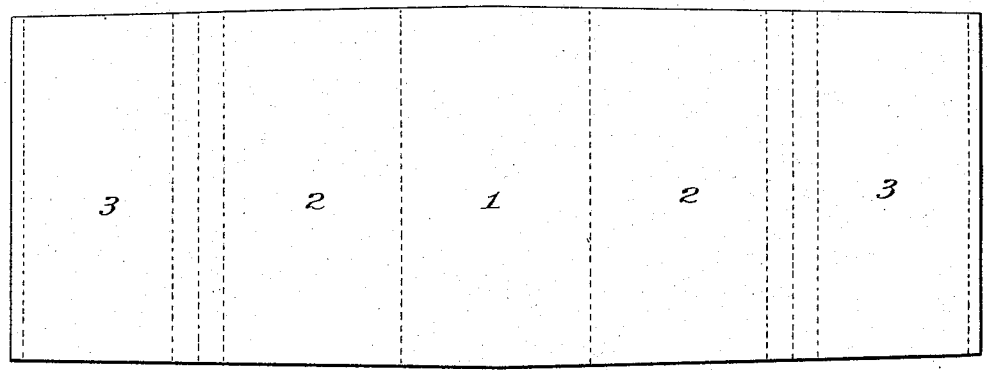
Figure 5:
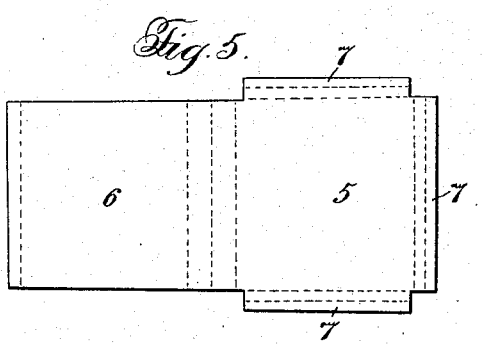

Figure 1 represents a perspective view of the flower box made in accordance with my invention. Fig. 2 is a longitudinal sectional view of Fig. 1. Fig. 3 is a transverse sectional view through Fig. 1. Figs. 4 and 5 are detail views of the blanks of metal used in the construction of the box.

Now referring more particularly to the drawings, wherein corresponding numerals indicate corresponding parts, the reference numeral 1 designates the substantially flat bottom of the box having integral side portions 2 projecting upwardly therefrom. These side portions extend at right angles to the bottom of the box and gradually slope upwardly, and have return bent portions or folds 3 offset from the upper portions of the sides and inclining downwardly adjacent the sides 2, but spaced therefrom and connected to the sides at their lower ends by any suitable means, preferably by soldering the upturned flanges 2' to the lower portion of the box, thereby providing air spaces or chambers 4 between the said folds for the purposes which will hereinafter appear. The sides are also preferably constructed with open ends to allow the free circulation of air between the folds, thereby producing a very efficient cooling means.

The ends 5 of the box or receptacle are constructed of a single sheet of metal and have return bent portions 6 spaced from the sides 5 at the top portion thereof, but integral therewith and adapted to be connected to the said end walls adjacent the bottom thereof by the offset flanges 6'. These return bent portions incline downwardly similarly to the return bent portions of the side walls 2 and provide a tapering open ended air chamber between the two folds. The object of these air chambers is to provide a box, which may be placed where it is subjected to sun-light to promote the growth of the plants therein, while the air spaces between the sides prevent the radiating of any heat to the interior of the box to cause the baking of the roots of the plates contained therein. The walls 5 at the sides and bottoms thereof are provided with flange portions 7 bent at right angles thereto and fashioned to form substantially U shaped recesses adapted to engage the corresponding edges of the sides and bottom of the box. These flange portions are preferably united to the sides and bottom of the box by soldering, but any other means may be readily used without departing from the invention. The bottom and sides of the container are composed of a single blank of sheet metal, which renders the construction of the same very inexpensive and is illustrated in Fig. 4 of the drawing, in which the numeral 1 designates the bottom, the numerals 2 the sides integral therewith, and the numerals 3 the return bent portions or folds which are spaced from the sides 2 when the blank is pressed into shape to provide the cooling air spaces between the two folds. The ends 5 are also each preferably composed of a single blank of metal provided with the return bent folds 6, and bottom and side extensions or flanges 7, which are bent in a manner such as illustrated in Fig. 2 to provide a connecting means for fastening the said ends to the bottom and sides. It will be readily seen that by constructing all of these parts of single blanks of metal, that I have not only devised a very simple construction, eliminating the use of any fastening means for retaining the different parts of the box together, but have produced a very strong and efficient container.

Arranged within the box and adjacent each end thereof are positioned partitions 8, these partitions extending parallel with the ends and spaced a slight distance therefrom, and forming with the ends a water chamber or reservoir. The partitions 8 are rigidly secured to the side walls 2 and bottom 3 by any suitable means, and at their lower end on each side thereof are cut-out portions 11 of substantially L shape formation, providing means whereby the water conducting members may be introduced into the reservoir and secured thereto. These partitions are substantially co-extensive with the ends 5, of the receptacle and may be spaced from said end any distance desired to provide water chambers of varying size as the occasion may require. It will also be apparent that my invention comprehends the use of a single chamber or reservoir within the box as good results can be obtained from this construction.

Extending parallel with the sides of the box and substantially co-extensive with each side thereof are the angular shape conducting tubes 12 perforated at different points 12' throughout their length and suitably secured to the bottom and side walls 2. These conducting members constitute a reinforcing means for the box and are open ended, and the opposite ends of the same enter the water chambers through the cut-out portion of the openings 11, formed in the partition 8 and provide means for feeding the water over substantially the entire area of the box.

From the foregoing description it will be seen that I have provided a box of the character described wherein water chambers or reservoirs adapted to hold a considerable amount of water are arranged within the walls of the box and have communicating therewith conducting members extending throughout the length of the box for feeding water to different parts thereof.

Having thus described the invention what I claim as new and desire to secure by Letters Patent is:

1. A receptacle of the class described, comprising a bottom and doubled side and end walls, the folds of the said side and end walls being spaced from each other and being opened at the corners thereof to provide a space for free circulation of air between the said folds for the purposes specified.

2. A receptacle of the class described, comprising a bottom composed of a single sheet of metal and having integral upstanding side walls having a rebent fold spaced therefrom, and connected at its lower portion to provide an air space, the said side walls being open at their corners to permit the free circulation of air between the folds, the end walls of the box being connected to the sides and composed of a sheet of metal having a spaced rebent fold adapted to provide an air space, the said end portion also having their corners open to permit the free circulation of air between the folds for the purposes specified.

3. A receptacle of the class described, comprising a bottom, doubled open ended side walls connected with the bottom, and extending upwardly therefrom, the folds of the doubled side walls being spaced from each other to provide air chambers therebetween, and end walls composed of an integral sheet of metal having rebent folds connected to the bottom and side walls, the said end walls being open ended to permit the free circulation of air between the folds, substantially as described.

4. A receptacle of the class described comprising side, end and bottom walls, the side and end walls being of uniform height, a partition arranged substantially coextensive with one of the end walls and housed within the receptacle, the said partition being secured to the side walls and adapted to be spaced from one of the end walls to form therewith a water chamber having an open upper end to permit the chamber to be readily charged with water, and a conducting member perforated throughout its length communicating with the water chamber, at its lower end and extending across the receptacle to distribute water to different parts thereof.

5. A receptacle of the class described, comprising side, end and bottom walls the side and end walls being of uniform depth, partitions arranged within the receptacle and rigidly secured to the side walls, the partitions being spaced from the end walls and parallel therewith throughout their length adapted to form therewith open ended water chambers, said partitions having cut-out portions at the lower end thereof, a series of open ended conducting members having a plurality of perforations therein extending throughout the length of the box adjacent the bottom thereof and entering the water chambers through the cut-out portions in the partitions to permit the water to be equally distributed to all parts of the receptacle.

6. A receptacle of the class described, comprising a bottom and doubled side walls, the folds of said side walls being spaced from each other and having relatively large air openings at the corners thereof to permit the free circulation of air between said folds, and end walls suitably secured to the bottom and side walls.

7. A receptacle of the class described comprising side end and bottom walls the side and end walls being of uniform depth, a partition associated with the receptacle and arranged therein, the said partition being disposed parallel with respect to one of the end walls and of substantially the same length forming with the said end wall an open ended water chamber whereby the said chamber may be charged with water when the receptacle occupies its normal position, and a water conducting member perforated its entire length and arranged within the receptacle and communicating with the lower portion of said chamber for distributing the water to the different parts of the receptacle.

In testimony whereof I affix my signature in presence of two witnesses.

SAMUEL T. WHITE.

Witnesses:
 G. E. LAU,
 CHARLES S. PRYOR.